United States Patent [19]

Moerman

[11] 4,112,347
[45] Sep. 5, 1978

[54] CONVERSION AND CONTROL OF ELECTRICAL ENERGY BY ELECTROMAGNETIC INDUCTION

[76] Inventor: Nathan A. Moerman, 7310 Maple Ave., Chevy Chase, Md. 20015

[21] Appl. No.: 762,896

[22] Filed: Jan. 26, 1977

Related U.S. Application Data

[62] Division of Ser. No. 635,007, Nov. 25, 1975, Pat. No. 4,020,440.

[51] Int. Cl.² .............................................. G05F 1/14
[52] U.S. Cl. .......................................... 323/6; 323/48; 323/56; 323/61
[58] Field of Search ................... 323/6, 20, 40, 48, 56, 323/57, 58, 60, 61; 363/152–154

[56] References Cited

U.S. PATENT DOCUMENTS

| | | | |
|---|---|---|---|
| 2,714,188 | 7/1955 | Scherer | 323/6 |
| 3,303,411 | 2/1967 | Gately | 323/40 |
| 3,372,283 | 3/1968 | Jaecklin | 323/48 |
| 3,657,455 | 4/1972 | Trice | 323/20 |

FOREIGN PATENT DOCUMENTS

| | | | |
|---|---|---|---|
| 165,722 | 4/1955 | Sweden | 323/56 |

*Primary Examiner*—Gerald Goldberg
*Attorney, Agent, or Firm*—Thomas O. Maser

[57] ABSTRACT

An alternating current power control circuit utilizing progressive variation of magnetic flux in associated magnetic paths. Voltage and current sensors at an output provide feedback signals to permeance control devices to apportion flux between a pair of magnetic paths such that the primary magnetizing current remains essentially unchanged during the control process.

7 Claims, 5 Drawing Figures

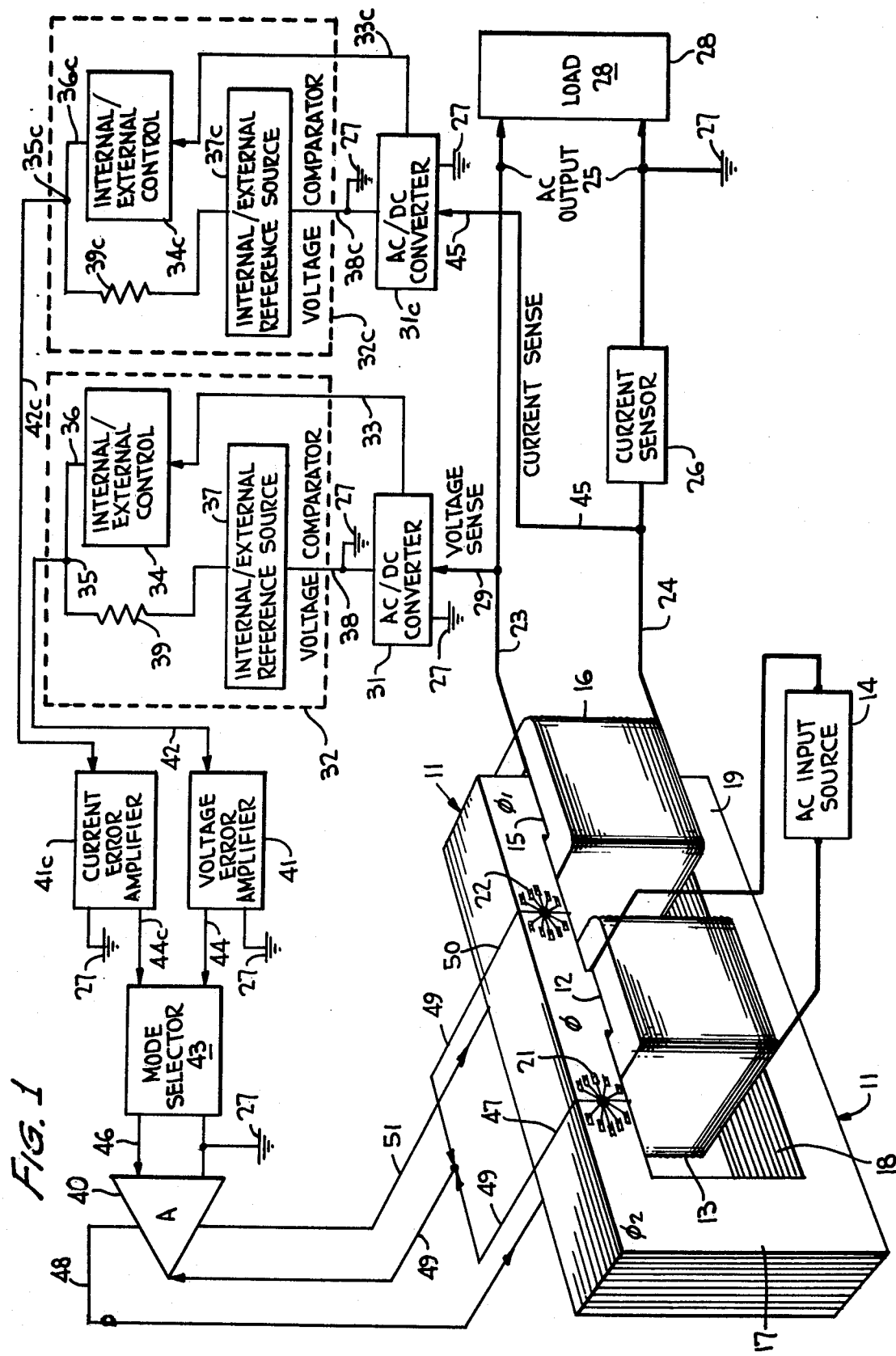

CONVERSION AND CONTROL OF ELECTRICAL ENERGY BY ELECTROMAGNETIC INDUCTION

GOVERNMENT USE

The invention described herein may be manufactured and used by or for the government of the United States of America for governmental purposes without the payment to me of any royalties thereon.

This is a division of application Ser. No. 635,007 filed Nov. 25, 1975, now U.S. Pat. No. 4,020,440.

DESCRIPTION OF THE PRIOR ART

U.S. Pat. to Toffolo et al No. 3,087,108 issued Apr. 24, 1963 in Class 323-56, the most pertinent prior art known to this inventor, is lacking in the teachings of this invention. The instant invention provides a broad range of electrical control unrestricted by frequency, voltage or current. Structurally, the instant invention employs complementary feedback amplification with an associated reference source to produce a stabilized sinusoidal output waveform. Toffolo et al lacks the teachings of a fully implemented feedback control system including an internal reference which would enable a full excursion of stabilized voltage and/or current and/or power control. Also, this invention utilizes interleaving as a coupling means whereas Toffolo et al uses abutments and air gaps. Other structural differences further preclude Toffolo et al as being anticipatory of this invention.

U.S. Pat. to Stimler No. 3,207,976 issued Sept. 21, 1965 in Class 323-56, the only other representative prior art known to this inventor, is also lacking in the teachings of this invention. Stimler is limited to small power applications such as in computers and in communication devices. My invention is directed to the full range of power applications and, accordingly, is structurally distinct.

No prior art teaches the control of magnetic flux in a continuous path in a uniform continuous proportional manner as set forth in this specification.

FIELD OF THE INVENTION

This invention is in the field of conversion and control of electrical energy by static magnetic means instead of by the conventional electronic switching or rotating machinery means. Included in the many applications of this invention is the effective management of the conversion, transmission, distribution, and utilization of electrical energy.

SUMMARY

Control of magnetic flux in a closed magnetic path is accomplished by the progressive control of permeance in an assigned section of the path. Several configurations for continuous permeance control by progressive saturation and/or domain rotation are functionally described as:
 a. radial saturation and domain rotation
 b. transverse saturation
   1. multiple hole
   2. single hole, multiple lamination
   3. combination of single hole, multiple lamination with radial saturation
 c. transverse domain rotation
A modifying characteristic for each of the above is obtained by a composite of magnetic materials with varying ratios of flux density to magnetomotive force combined with various structural configurations to achieve specific transfer characteristics.

Prior to the contributions of this invention, a technology for the total control of an electrical circuit by purely static magnetic means was not available. With the teachings of only the prior art incorporated therein, a single loop magnetic transformer core, for example, with some means for permeance control, a primary winding and a secondary winding; control of energy is not realizable for energy applied to the alternating current primary winding and transferred to the secondary winding and its load. This is because the reduction of permeance in a single loop magnetic circuit causes and enhances an excessive and, most likely, an uncontrolled rise in core magnetizing current; this results from the reduction in counter electromotive force. This deficiency in the single loop magnetic circuit is removed by a balanced configuration wherein the magnetizing current in the primary circuit is maintained relatively constant by the imposition of the requirement that the sum of the flux in two controlled paths resulting from such balanced configuration substantially equals the relatively constant flux in the primary path for any operating condition. Windings of the permeance control sections in each of the paths are interconnected through external electronic complementary drive apportioning amplifiers to achieve this objective.

In an alternating current power controller, the center leg of a three legged magnetic structure is assigned to the alternating current primary circuit. The outer legs obtain alternating current produced flux through associated permeance control sections controlled in a complementary circuit configuration such that the primary magnetizing current is essentially unchanged as the flux is transferred from one outer leg to the other. A single output winding on either of the outer legs will supply a controlled change in output voltage or current by means of an open loop or feedback amplifier control. Output windings on both outer legs will supply complementary output voltages as the permeance control sections are driven through their total excursions. Feedback circuit configurations enable control of constant voltage or constant current for alternating or direct current loads.

This invention is directed to magnetic circuit means for conversion and control of electrical energy from power sources. For the first time, megawatts of electrical energy can be controlled and/or converted without moving mechanical elements and without voltage or current limited circuit control elements. Among the many features of this invention is the design freedom to couple electrical energy from any alternating or direct current source at a wide range of voltage, current, or frequency of alternations, such as from a high speed alternator, high constant current direct current source, of a high voltage low current source. Also, this invention provides the means for universal electrical energy conversion system for coupling into existing power networks from sources such as magnetohydrodynamic generators, electro fluiddynamic generators, fuel cells, solar cells, thermoelectric generators, thermionic generators, and the projected thermonuclear fusion direct conversion electrical generators.

The external electronic control capability of these electric power conversion devices enables programmed momentary suppression of power output to aid the normally difficult circuit breaker operations. Electronic control of reactive current devices permit power factor correction and suppression of voltage surges in high voltage transmission circuits.

In bulk electric power generation and transmission, a basic design of square wave alternator can serve as the electrical power source for both sinewave alternating current and direct current power transmission, through the intermediary of the conversion means described in this invention.

Thus, this invention provides the component means for an effective high power, high voltage transmission system including the coupling converter from the power generating source to the transmission line and the branching terminal converters followed by distribution conversion and control subsystems. The inherent external electronic control afforded by this invention enables computer control of a power system network. This invention also provides a means for limiting direct current in high power direct current circuits during overload or short circuit, and provides a means for direct current switching, heretofore a difficult task.

In summation, this invention provides a means for controlled electromagnetic induction to achieve electrical power control in contrast to the prior art involving elements operating in the electric circuit, with current and voltage limitations and fixed forward voltage drops, such as mercury-arc rectifiers, silicon controlled rectifiers, etc. This invention offers for the first time a universal capability for the transformation of electrical energy; direct to direct current, direct to alternating current, alternating to direct current, alternating to alternating current, and frequency to frequency; all without moving mechanical parts.

It is, therefore, an object of this invention to provide electrical power control by controlled electromagnetic induction.

Another object of this invention is to provide a universal capability for transformation of electrical energy.

A further object of this invention is to provide a controlled electromagnetic induction means for controlling alternating current power.

A still further object of this invention is the elimination of moving parts and electrical controlling elements which have current and/or voltage limitations and fixed forward voltage drops.

Another object of this invention is for the control of power in an open or closed loop process control.

Another object of this invention is to reduce size and weight of electrical conversion and control structures by the generation, conversion and control of high frequency electrical power.

A still further object of this invention is to provide an electric power control means responsive to a sensed physical state, such as: voltage, current, power, temperature, pressure, strain, humidity, acidity, or the like.

Another object of this invention is to provide control of electrical power by electronic control of magnetic means in static configurations.

Yet another object of this invention is to provide switching of electrical circuitry without the use of mechanical switches.

A further object of this invention is to provide an alternating current power controller with feedback from a rectified direct current output therefrom wherein either sensed voltage or current at predetermined threshold levels enable automatic crossover between constant voltage and constant current control.

A still further object of this invention is the control of electrical pulses to a process control.

Another object of this invention is to provide static magnetic means for amplifying electric power.

A further object of this invention is to provide automatic power factor adjustment.

An object of this invention is to provide the means for the computer control of power subsystems in an electric power network.

Another object of this invention is to provide means for power waveform generation of arbitrary shape or step function.

Still another object of this invention is to provide means for control of voltage, current, and phase of a power subsystem of an electrical power network.

A further object of this invention is to provide means for the suppression of and the protection from power surges, transmission line fault, and transient phenomena.

The exact nature of this invention as well as other objects and advantages thereof will be readily apparent from consideration of the following specification relating to the annexed drawings in which:

BRIEF DESCRIPTION OF THE DRAWINGS

FIG. 1 shows an alternating current power control means,

DESCRIPTION OF A PREFERRED EMBODIMENT

Figure 3:
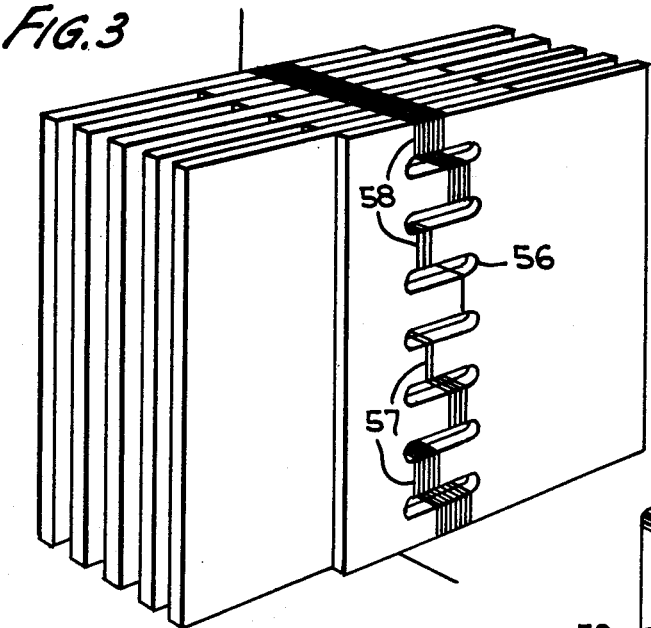
FIG. 3 shows details of a multiple hole transverse saturation permeance control section.

Turning now to the drawings, FIG. 1 shows an alternating current power controlling device incorporating the elements of this invention. The shell type magnetic core 11 is configured so as to have an input leg 12 with input winding 13 therearound. The input current connected to input winding 13 is from alternating current source 14. Output leg 15 of core 11 has an output winding 16 thereon. A flux bypass leg 17 is magnetically integral with a first return section 18 coupling said bypass leg 17 to input leg 12. A second return leg 19 couples said input leg 12 to said output leg 15. A first permeance control section 21 is coupled to complete the magnetic circuit through input leg 12, first permeance control section 21, bypass 17 and first return section 18. A second permeance control section 22 is coupled to complete the magnetic circuit through input leg 12, second permeance control 22, output leg 15 and second return section 19 back to input leg 12.

Output winding 16 has two output leads 23 and 24, respectively. The alternating current power output terminals 25 have connected output lead 23 to one of terminals 25 and a current sensing device 26 connected between output lead 24 and the other of the terminals 25. The said other terminal 25 is also connected to a common return 27. A load 28 is connected across the power output terminals 25. A voltage sense lead 29 is connected between output lead 23 and an alternating to direct current converter 31. From common return 27 in a voltage comparison device 32, a bridge in this example, the feedback voltage provided from converter 31 in direct current form is connected through lead 33 to an internal or an external voltage control 34, the output of which is connected to a junction 35 through a lead 36.

Also from common return 27 in bridge 32, an internal or external reference source 37 is connected by a lead 38. Between bridge output junction 35 and reference source 37 is connected a fixed resistor 39. A voltage error signal amplifier 41 is connected to bridge output terminal 35 by a lead 42. The output of error amplifier 41 is connected to a mode selector 43 through a lead 44.

Between output winding 16 and current sensor 26, a current sense lead 45 connects to duplicate structure identical with that of the voltage control section just described with the exception of the specific component values. Since the feedback levels in the current sensing section are far lower than that in the voltage sensing section, the components are designed accordingly. As far as the mode selector 43 is concerned, the input voltages thereto are substantially in the same range or excursion. The output of the mode selector 43 is connected as the input to a complementary apportioning feedback amplifier 40 through a lead 46. The amplifier 40, mode selector 43, and the error amplifiers are connected to the common return 27. Winding 47 of permeance control section 21 is connected to the output of the amplifier 40 through lead 48 and return 49. Winding 50 of permeance control section 22 is connected as the other output of amplifier 40 through lead 51 and return 49.

Amplifier 40 is a direct coupled, complementary output amplifier. That is, the outputs of the amplifier drive the permeance control sections 21 and 22 in inverse relationship. When the energizing current in one permeance control section is at a maximum value, the energizing current for the other permeance control section is at a minimum value. When one is at 25 percent of its maximum, the other is at 75 percent of its maximum. These conditions may assume any intermediate values, including complete reversal from the original state, and remain in inverse relationship at all times.

Figure 2:
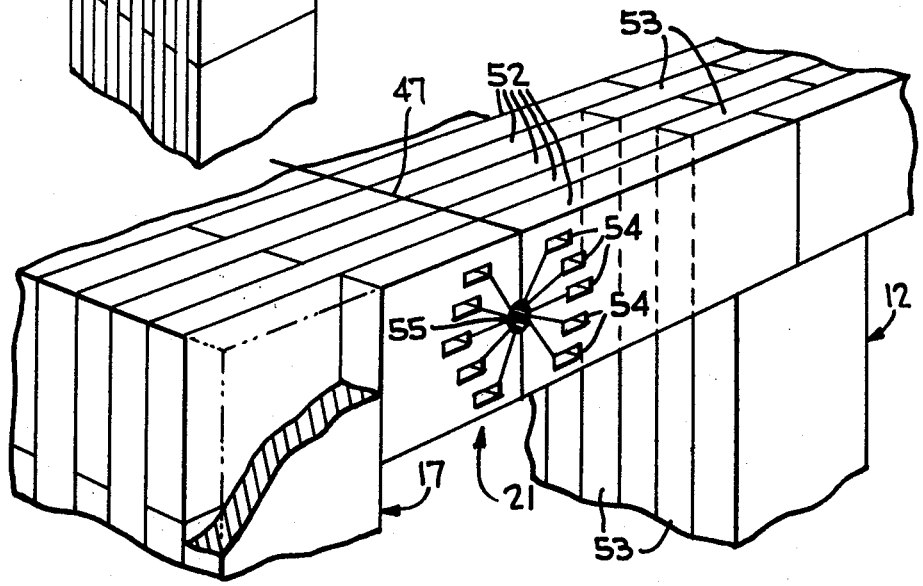
FIG. 2 shows details of a radial saturation and domain rotation permeance control section.

FIG. 2 shows the details of a radial saturation and domain rotation permeance control section 21. The permeance control section 21 is interleaved into the structure between legs 12 and 17, for example. The different lamina of leg 12 can have alternate layers extend to the exterior surface as shown by lamina 53. The interleaving increases the net permeance at the junctions of separate elements considerably greater than the mere abutment of path elements. Obviously, many designs of the interleaving and/or abutments of the sections into the main magnetic paths are possible within the teachings of this invention.

Each of the elements 52 has a plurality of winding holes 54 which are concentrically disposed about a central hole 55 and include the outer surfaces of the section. Winding 47 is toroidally wound through the central hole and the concentrically disposed holes to form a segmented toroidal winding. Holes 54 are configured to be narrow in the direction of the magnetic path so as to minimize the net cross section reduction in the region of the permeance control section. This provides a sufficient magnetic path while providing control. The control winding includes the segmented toroidal wires stated above with winding segments that surround the outer surface of the section, resulting in a near toroidal configuration.

A uniformly varying excitation current applied to the winding of the permeance control section yields a progressive, continuous variation of the permeance across the control section. This results from the varying radial saturation about the center hole of the toroid. The saturation of the toroidal section expands radially as the excitation current is increased. The net effect of this control element on the permeance of the path is a combined function of radial saturation, as described, plus a component of domain rotation produced by that component of the toroidal flux which is transverse to the main flux path. This transverse component results from the circular distribution of magnetic domains. The plurality of holes disposed about the center hole in a circular form with the outer edges of the control section being on the circumference of such circular form results in the near circular control flux about the center hole. The transfer characteristic between the excitation current and the permeance of the main magnetic path can be altered as desired by structural and magnetic property variation of the magnetic materials, either in a homogenious structure or a composite structure. Interleaving and/or abutments serve to provide low reluctance coupling within the main magnetic path. These last two sentences apply also to the species of FIGS. 3, 4, and 5.

OPERATION OF THE EMBODIMENT IN FIG. 1

The operation of the alternating current power control means of FIG. 1 is achieved, basically, by the controlled transfer of alternating current power between an input source and an output circuit through a variable permeance magnetic circuit. This is achieved by means of flux apportioning between an output path and a bypass path, under feedback control including a reference source.

The alternating current power controlled in FIG. 1 is capable of providing a stabilized, adjustable output voltage level over a wide range of voltage levels. It is also capable of providing the stabilization of a selected output voltage under varying input and output conditions, such as source or load fluctuations. The controller is further capable of controlling output power on an adjustable constant current basis. Additionally, where a direct current load is derived from the output of the alternating current controller, stabilization of the direct current load can be made therefrom. Among the many uses of this controller are the open or closed loop servo control applications.

To accomplish the several functions of this controller, the voltage of the output winding 16 is sensed by lead 29 and directed to the alternating to direct current converter 31 for conversion into a direct current level representative of the output voltage. This direct current level is applied as the input to the feedback input portion of the voltage comparator bridge 32 and serves to stabilize the output voltage against input power and load variations. The feedback voltage is compared against the reference voltage generated by reference source 37 to derive an error signal at junction 35 through the network including fixed resistor 39 and the variable element in the internal or external voltage control 34. In the operation of the control 34, the control may be in the form of a variable resistor or any adequate means of varying the current in the bridge by local or remote means. In the external operation, the control may be the same means as for internal operation, except for the addition of a sensing device with means of operating the variable control 34, said sensing device being included in the feedback configuration.

An additional control point in the feedback circuit is provided by the reference source 37, either internal or external. An external reference may be of several forms such as a low frequency waveform for output modulation or a step change in voltage to change the scale of the voltage or current control 34.

The output of the bridge 32 is applied as the input to the voltage error signal amplifier 41 which amplifies the error signal to a level sufficient to initiate the operation of the mode selector 43. Also supplied as an input to the mode selector 43 is an error signal from current sensing circuitry including current sensor 26, lead 45, alternating to direct current converter 31C, voltage comparator 32C, and current error amplifier 41C. The voltage level in lead 45 is the voltage drop across current sensor 26 representing the current in the load circuit. The voltage control 34 and the current control 34C establish a boundary condition within which the alternating current power controller of FIG. 1 will operate. The boundary voltage can be, for example, 100 volts and the boundary current can be set at 10 amperes, again for example. This means tht the load can be operated at any combination of values within these boundaries under stable conditions.

The mode selector 43 selects either the amplified voltage error signal or the amplified current error signal depending upon the condition at the load. The circuitry within mode selector 43 compares the amplitudes of the amplified error signals and selects the higher of the two to determine the operation mode to which the alternating current power control will respond, as required by load circuit conditions. To continue the above example, if a constant 100 volt output from winding 16 is selected, a spurious rise of current will be limited to the selected 10 amperes. A load condition that would exceed 10 amperes causes the mode selector to select the constant current mode, thus allowing the voltage to fall to maintain the preset current limit.

The output of the mode selector 43 is applied as the input to the apportioning amplifier 40. The input section of the amplifier 40 is a phase inverter which drives the complementary output power stages to feed the permeance control elements 21 and 22. The apportioning of current through the permeance control elements inversely apportions the flux between the load path and the bypass path to adjust the output energy in the load circuit in response to the feedback signal.

A modification of FIG. 1 would be a polyphase power system which could be satisfied by equipping each phase independently as in FIG. 1. With common return as in a wye configuration connection, for example, output windings are then connected to a three phase line or load.

A further modification of FIG. 1, whereby a winding on the bypass leg is treated as a second output, achieves a complementary power output configuration useful for balanced or fixed loads. This configuration will find general application in closed loop servo control systems where the complementary power output is used to drive servo bi-directional motors or other process control elements. A unique application is in power factor correction for alternating current power system. The error signal in this case, is defined by the leading or lagging phase angle of alternating current with respect to line voltage. Two two output windings are connected, respectively, to an inductor and a capacitor. Leading or lagging current is diminished by the reflected inductive or capacitive load, respectively, through the input winding.

A direct current load can be supplied by this embodiment through the addition of an alternating to direct current converter between the output winding leads 23 and 24 and the junction for lead 29. In this case, the alternating to direct current converters 31 and 31C can be bypassed since the sensed signals are already in direct current form.

To achieve the operational characteristics as described, the maximum mutual coupling between input and output windings is accordingly compromised in system tradeoffs. The resulting increase in leakage reactance is minimized by design optimization.

A basic principle evolves from this invention wherein the electromagnetic induction in the output winding of a transformer-like structure is made dependent upon the time rate of change of magnetic flux amplitude which is controlled by external means in relation to a reference source and a controlled output set point in a stabilizing feedback system. With this capability, a source of electric power can be controlled at the load terminals in response to a sensed physical parameter related to the load, and not be restricted by voltage, current, or power levels required by the load. A further extension of the power control capability inherent in this invention is provided by computer program or other form of decision element applied to a single power source and load or a power network configuration.

In the control and stabilization of alternating current power over the full excursion of voltage and current within preestablished limits, a means is required to uniformly vary the voltage or current at a load with respect to a stabilizing reference voltage. This invention satisfies this requirement through the implementation of a variable permeance transformer-like structure, which is controlled by a feedback circuit containing a reference voltage source and means for external or internal voltage and current limit adjustments.

PERMEANCE CONTROL SECTION IN FIG. 3

FIG. 3 shows the multiple hole or slot transverse saturation permeance control section modification. A plurality of transverse slots are provided for the windings of the control section. Each slot has its longest dimension parallel to the main flux path and is disposed one above the other between the edges of the control section. The central slot 56 is located midway between the edges of the control section and the remainder are disposed so that adjacent slots are equidistant from each other and the outer slots are the same distance from the edges of the control section as the adjacent slots are from each other along a transverse path. The windings 57 below the central slot are reverse wound with respect to the windings 58 above said central slot to produce a rotating, reinforcing flux and also cancel main path flux induction. There is a graduated symmetrical number of winding turns, serially connected, from the center slot to the outer slot but the total number of turns above the center slot equals the total number of turns below the center slot. That portion of the control section with the greatest number of turns will be saturated ahead of the other portions. The other portions will saturate progressively in direct relationship to the number of turns. The location of the largest and smallest number of turns can, obviously, be reversed. Also, the largest number can be at one edge of the section with a progressive lessening of the number of windings to have the smallest number of windings at the other edge of the section. A uniform increase in excitation current applied to the winding terminals produces a progressive reduction in permeance of the magnetic path in which the control section is inserted.

PERMEANCE CONTROL SECTION IN FIG. 4

Figure 4:
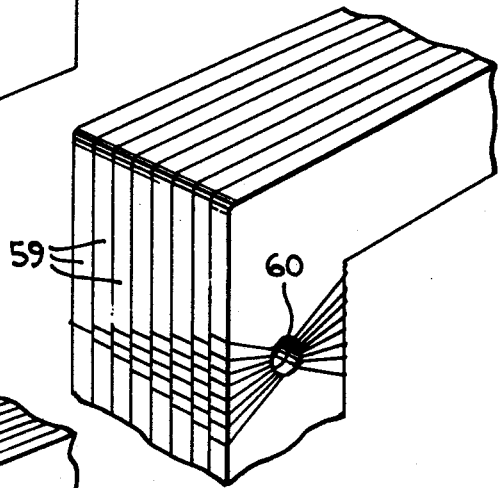
FIG. 4 shows details of a single hole multiple lamination transverse saturation permeance control section.

FIG. 4 shows a single hole, multiple lamination transverse saturation permeance control section modification. The smallest number of windings 59 is on an outer lamination and the successive lamination windings have progressively increasing number of turns resulting in the largest number of windings on the other outer lamination. An acceptable variation would be to have the maximum number of windings at the edges of the section and the minimum on the center lamination, or the reverse thereof. From maximum to minimum, the number of windings is progressively distributed among the lamina comprising the section.

Each of the windings is connected in series with the adjacent windings and phased so as to produce a direction of flux flow about the center hole 60 that is the same for adjacent laminations. The technique for producing these windings and preserving the close spacing between the laminations will borrow heavily from printed and deposited circuit technology. When energizing current is applied, that lamination with the largest number of windings will saturate first in the region between the center hole 60 and the outer edges of the section. The other laminations will saturate in like manner in a sequence directly related to the number of associated winding turns. Hole 60 is centered in the permeance control section and windings are wound as a partial toroid with an equal number of turns on each side of the control section with respect to such hole 60. It is to be noted that the radial saturation control of FIG. 2 can be a modification to the stratified saturation control of FIG. 4 to provide a finer degree of progressive permeance control.

PERMEANCE CONTROL IN FIG. 5

Figure 5:
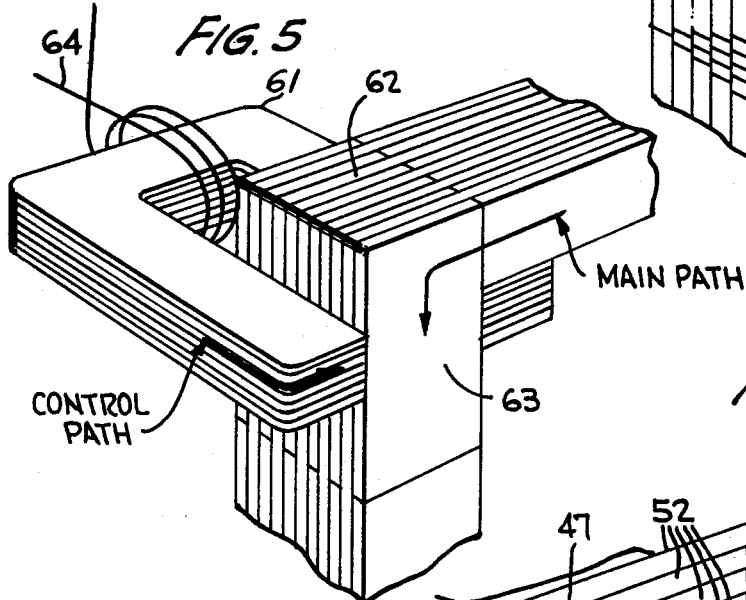
FIG. 5 shows details of a transverse domain rotation permeance control section.

FIG. 5 shows a transverse domain rotation permeance control modification. The control element 61 is a closed loop toroidal structure, a portion of which is coupled into the main flux path 62 by interleaving or abutment. That section of the control element between the interleaving is the permeance control section 63 which will be subject to an orthogonal flux generated by currents in a control winding 64. The magnetic domains in the control section 63 are progressively rotated in proportion to the magnitude of the control current passing through winding 64, resulting thereby, in a reduction of permeance in the main flux path.

SUMMARY

In summation, this invention teaches an advanced concept and provides the embodiment for a universal electrical power conversion and control technology. With the basic structure of transformer-like design, the conversion and control system can be scaled to any voltage, current, or power and limited only by the state of the art in power transformer technology. The frequency of operation is limited only by the available permeable magnetic materials at the highest frequency of operation.

Furthermore, the invention teaches the means for configuring electromagnetic elements of several types for effecting the control of permeance in closed magnetic circuits. Continuous control of permeance over prescribed transfer characteristics is achieved by combined use of magnetic materials of differing characteristics and structural combinations.

Further, the invention teaches the means for uniformly controlling the dynamic transfer of magnetic flux from a source path to an output path, where electromagnetic induction provides predetermined voltages, currents, and waveforms at an output circuit.

This invention teaches the multiple advantages of the integration of a feedback system with the controllable magnetic circuits, affording control flexibility to enable constant voltage or constant current operation, predetermined internal and/or external control of voltage or current, and responsiveness of the system to selected physical states of the power load device.

Further, this invention teaches the means for relatively low energy loss in the conversion and control process as compared to resistors, semiconductors, and plasma discharge devices for this purpose as used in the prior art.

In addition, the invention teaches the means for effecting the smooth control of power to utilization devices by manual or automatic electronic means, and to effect the protection of the electric power circuit against overcurrent, overvoltage, and power factor deviation.

Finally, this invention teaches the means for configuring an electrical power conversion, transmission, and distribution network system with the capability for continuous monitoring of system elements and heirarchal control with computer assist and man-machine interface. This permits the execution of smooth power switching that avoids shock excitation of transmission circuits and minimizes circuit instabilities. This is realized by preprogrammed turn off and turn on of output power from the active transformer-like structures of this invention. Circuit breaker operation is synchronized to occur during the preprogrammed period of suppressed output power.

The bypass of magnetomotive force, inherent in the transformer-like structures of this invention, affords the means for employing the bypass magnetic path to couple power to a program switched dummy load for a prescribed period during power source and network adjustment to a catastrophic circuit failure.

Major elements of such an elaborate power network would include a source of electrical energy, a coupling means, a transmission circuit, a terminal converter, a distribution network, and, possibly a converter required by a load device which utilizes a form of electricity different from that supplied by the terminal converter. Each of these elements would have communication lines to a computer assisted hierarchal control and man-machine interface from which control would be effected for the entire system.

For example, an alternating current power source with an alternating to direct current coupling means, means to transmit bulk direct current power at high voltage over transmission lines to a terminal direct to alternating current converter for local area alternating current distribution network, and a direct to direct current converter connected to the direct current transmission lines provides for a direct current load network, all controlled by a control with computer assist, make up such a system as taught by this inventor. The alternating current power transmission path would consist of an alternating to alternating current converter, power transmission lines, and a second alternating to alternating current converter connected to a local area network. For direct current loads, an alternating to direct current converter would be needed to be connected between the alternating current transmission lines and the direct current loads.

Transmission lines and terminal equipment are protected by means responsive to overcurrent and overvoltage and such means also provides for the performing of programmed circuit switching, in either the alternating or direct current examples. Also, the power network system operating parameters are continually monitored over communication links by the hierarchal control which covers local, central, and regional areas of the power network. The hierarchal control is assisted by the computer at the various network levels and man-machine interface facilities. Responsive control signals are transmitted over communication links to the power coupling converters and switching controls through their accessible external control inputs.

The functions of the reverse transient suppressors which are shown in FIGS. 6, 9, 11, and 13 are to divert away from the input and output circuits and to dissipate the significant, undesired portion of stored energy in a magnetic path during the transition period. The transients resulting from the switching of the stored energy in the magnetic paths are minimized by the suppressors.

I claim:

1. In a control means for an electric power circuit,
an input,
an output,
a plurality of complete magnetic flux path means, one of said path means connecting said input and said output,
each of said path means including a means for progressively controlling the permeance thereof to maintain the magnetizing current relatively constant, and an induction means for effecting control of said power circuit,
a voltage comparator means including a first reference source and means for comparing said first reference source with the output voltage level and producing a voltage difference signal,
a current comparator means including a second reference source and means for comparing said second reference source with the output current level and producing a current difference signal,
a magnetic flux apportioning means responding to a selected one of said difference signals to establish control levels for said means for controlling permeance to stabilize said power circuit with respect to said voltage and current reference sources, and
means connecting said voltage and current comparator means between said output and said apportioning means.

2. In a control means for an electrically controlled system,
a plurality of complete magnetic flux path means, each of said path means including a means for progressively controlling the permeance thereof and an induction means for effecting control of said controlled system,
a feedback means for sensing a physical parameter in said controlled system,
a comparator means including a reference source and means for comparing said reference source with said physical parameter and producing a difference signal,
a magnetic flux apportioning means responding to said difference signal to establish control levels to said means for controlling permeance to stabilize said physical parameter with respect to said reference source, and means connecting said comparator means between said feedback means and said apportioning means.

3. In an electromagnetic induction device,
a first flux path including an input leg with an input winding coupled thereto, and an output leg with an output winding coupled thereto,
a second flux path including said input leg and a bypass leg,
a first permeance control means in said first flux path between said input leg and said output leg,
a second permeance control means in said second flux path between said input leg and said bypass leg,
means for sensing the voltage across said output winding,
means for sensing the current through said output winding, and
a complementary amplifier responsive to a selected one of said voltage and current sensing means and connected to said permeance control means to apportion flux between said first and second flux paths while maintaining the quantity of flux in said input leg relatively constant.

4. In combination,
a magnetic core structure including an input element having first and second ends, an output element having first and second ends, a bypass element having first and second ends, a first permeance control section having first and second ends, a second permeance control section having first and second ends, said first end of said bypass element integral with said first end of said first permeance control section, said second end of said bypass element integral with said first end of said input element, said first end of said output element integral with said first end of said second permeance control section, said second end of said output element integral with said second end of said input element, said first end of said input element integral with said second ends of said first and said second permeance control sections,
input winding means coupled to said input element,
output winding means coupled to said output element, said output winding means having two output leads,
first control means responsive to current changes in one of said output leads,
second control means responsive to voltage changes in the other of said output leads,
means for connecting a selected one of said first and second control means to said permeance control means, and
means responsive to said control means for selectively apportioning magnetizing current between said output element and said bypass element such that the magnetizing current in said input element remains relatively constant.

5. An electromagnetic induction means for the conversion of an alternating current input into a controlled variable alternating current voltage output comprising:
a variable permeance magnetic path means made up of first, second and third sections,
each of said sections having first and second ends,
an input winding means surrounding said first section,
an output winding means having load and common connections and surrounding said second section, a first permeance control means electromagnetically coupled between said first ends of said first and second sections, said second ends of said first, second and third sections joined to each other, a second permeance control means electromagnetically coupled between said first ends of said first and third sections, a feedback means, a reference voltage means, an output voltage setting means, means connecting said feedback means to said load connection of said output winding means and to said reference voltage means, means connecting said reference voltage means to said output voltage setting means, and an amplifier connecting said voltage setting means to said first and second permeance control means to control said output voltage by effecting a complementary variation of permeance within said second and third sections while maintaining the permeance in said first section relatively constant.

6. An electromagnetic induction means for the conversion of an alternating current input into a controlled current comprising:

a variable permeance magnetic path means made up of first, second and third sections, each of said sections having first and second ends, an input winding means surrounding said first section, an output winding means having load and common connections and surrounding said second section, a first permeance control means electromagneitcally coupled between said first ends of said first and second section, a second permeance control means electromagnetically coupled between said first ends of said first and third sections, said second ends of said first, second and third sections joined to each other, a current sensing means, a feedback means, a reference voltage means, an output current setting means, means connecting said feedback means to said current sensing means and the common connection of said output winding means and to said reference voltage means, means connecting said reference voltage means to said output current setting means, and an amplifier connecting said current setting means to said first and said second permeance control means to control said output current by effecting a complementary variation of permeance within said second and third sections while maintaining the permeance in said first section relatively constant.

7. An electromagnetic induction means for the control and stabilization of alternating current power at a load from an alternating current power source comprising, an alternating current power transformer means including a first closed magnetic path about an input leg and an output leg, and a second closed magnetic paths about the input leg and a bypass leg, a first permeance control section coupling said input leg to the output leg in said first closed magnetic path, and a second permeance control section coupling said input leg to the by-pass leg in said second closed magnetic path, an alternating current power input winding means surrounding said input leg, an alternating current power output winding means surrounding said output leg, said output winding means having a pair of output leads, a load current sensor means, a load terminal means connected to one of said output winding leads in series with said current sensor means, a first voltage comparator means including a stabilized voltage reference and an output voltage setting control means, a voltage feedback means coupled from said load terminals to said first voltage comparator means, a voltage error signal amplifier means, means connecting the output of said first voltage comparator means to said voltage error signal amplifier means, a second voltage comparator means including a stabilized reference voltage and an output current setting control, a feedback current sensing means coupled to said current sensor and to said second voltage comparator means, a current error signal amplifier means, means connecting the output of said second voltage comparator means to said current error signal amplifiers means, means connecting the output of said second voltage comparator means to said current error signal amplifier means, a control mode selector means, means connecting the outputs of said voltage error amplifier means and said current error amplifier means as the inputs to said control mode selector means, and a permeance control complementary amplifier means coupling said mode selector means and said first and second permeance control sections for selectively apportioning the magnetic flux between said first and second closed magnetic paths while maintaining the magnetic flux in said input leg relatively constant, whereby electromagnetic induction in said alternating current power output winding means produces a stabilized alternating current voltage at the terminals of said load means in response to said first voltage comparator means with said control mode selector means enabling voltage mode operation, whereby electromagnetic induction in said alternating current power output winding means produces a stabilized output alternating power current to said load means in response to said second voltage comparator means and with said control mode selector means enabling current mode operation.

* * * * *